United States Patent [19]

Onoe et al.

[11] Patent Number: 5,521,750
[45] Date of Patent: May 28, 1996

[54] PROCESS FOR FORMING PROTON EXCHANGE LAYER AND WAVELENGTH CONVERTING ELEMENT

[75] Inventors: Atsushi Onoe; Satoshi Miyaguchi; Yoshiaki Watanabe, all of Tsurugashima, Japan

[73] Assignee: Pioneer Electric Corporation, Tokyo, Japan

[21] Appl. No.: 404,632

[22] Filed: Mar. 15, 1995

[30] Foreign Application Priority Data

Mar. 17, 1994 [JP] Japan ..................................... 6-047280

[51] Int. Cl.$^6$ ..................................................... G02F 1/35
[52] U.S. Cl. ........................................... 359/332; 385/122
[58] Field of Search ..................................... 359/326, 328, 359/332; 385/122

[56] References Cited

U.S. PATENT DOCUMENTS 4,925,263  5/1990  Sanford et al. ..................... 359/328 X
5,317,666  5/1994  Agostinelli et al. ..................... 385/122
5,434,700  7/1995  Yoo ......................................... 359/332

*Primary Examiner*—John D. Lee
*Attorney, Agent, or Firm*—Fish & Richardson

[57] ABSTRACT

A wavelength converting element comprises; an X or Y-out substrate made of lithium tantalate crystal or lithium niobate crystal having a major surface containing a Z-axis of the crystal; polarization inversion layers formed the major surface each extending in the Z-axis and treated by applying an electric field of direct current to the substrate wherein the electric field of direct current contains a field component toward an inverse direction of the Z-axis intersecting at an angle of $\theta$ in a range of $0°<\theta<90°$ with respect to the Z-axis during an annealing of the substrate; and an optical waveguide intersecting with the polarization inversion layers formed and treated on the major surface of the substrate, thereby achieving deep polarization inversion layers with a fine pitch and width on a Y or X-cut surface of the crystal substrate to satisfy a high QPM condition to produce a wavelength converting element capable of direct coupling with a semiconductor laser and having a high optical converting efficiency.

2 Claims, 10 Drawing Sheets

DIRECTION OF POLARIZATION OF SUBSTRATE

DIRECTION OF POLARIZATION OF POLARIZATION INVERSION LAYER 5,521,750

PROCESS FOR FORMING PROTON EXCHANGE LAYER AND WAVELENGTH CONVERTING ELEMENT

BACKGROUND OF THE INVENTION

1. Field of the Invention

The present invention relates to an optical wavelength converting element which utilizes a Secondary Harmonic Generation (SHG) based on a Quasi-Phase Matching (QPM) and is so-called as a QPM-SHG element, and in particular to a process for forming polarization inversion layers with a QPM structure on a substrate made of a ferroelectric crystal used for the QPM-SHG element.

2. Description of the Related Art

The QPM-SHG element comprises an extended core or three-dimensional waveguide made of a ferroelectric body, a clad with a low index of refraction surrounding the waveguide and a periodic domain inversion structure along the extending direction of the waveguide. The QPM-SHG element generates a secondary harmonic of a half wave $\lambda/2$ for a fundamental wave $\lambda$ of an input light injected to the waveguide under the conditions of quasi-phase matching (QPM). In the QPM-SHG element as shown in FIG. 1, a substrate 1 of a ferroelectric crystal has a plurality of polarization inversion layers 3 disposed periodically along a three-dimensional waveguide 2 in which the fundamental wave is guided. The polarization of polarization inversion layers 3 alternately reverse side by side in the extending direction of the waveguide as the polarization directions are indicated by an arrowhead broken line in the figure. The fundamental wave is injected to an input end surface of the waveguide 2 and propagates across the polarization inversion layers 3, so that the secondary harmonic appears as an output from the other end with the fundamental wave. Generally, the second harmonics output has such a property that as this output propagates, it periodically reaches the peak and trough levels every coherence length. Quasi-phase matching is a matching method which utilizes this property to alternately invert the sign of a polarization wave that is generated every coherence length (periodic domain inversion structure), and adds the outputs of the second harmonics to increase the output.

For the ferroelectric crystal substrate 1 of the QPM-SHG element, crystals of lithium niobate ($LiNbO_3$) having a high nonlinear optical coefficient (referring as LN hereinafter) and lithium tantalate ($LiTaO_3$) insusceptible to optical damage (referring as LT hereinafter) are used as crystal substrates. The Z-axis or C-axis direction coincides with the polarization direction in LN and LT crystals. The LN and LT crystals have domain inversion characteristics by which the inversion of polarization in the direction of the Z axis of the crystal or the inversion of the polarization domain is likely to occur due to an external factor such as an impurity, distortion stress, heat, or an electric field. As shown in FIG. 1, a Z-cut substrate 1 of LN or LT crystal (substrate having, as a major surface, a Z cut face z containing the X-Y axes with the Z axis of the crystal as a normal line in FIG. 1) is mainly used as a wavelength converting element. There is a method of forming a periodic domain inversion structure or polarization inversion layers along an optical waveguide, for example, a heat treatment at near the Curie point, in which the proton exchange is conducted on the major surface of Z-cut substrate of a LN or LT crystal by application of pyrophosphoric acid and then the resultant substrate is subjected to heat treatment at near the Curie point. In this manner, a three-dimensional waveguide and polarization inversion layers are formed on the Z-cut surface of the substrate of a LN or LT crystal.

Generally, the conventional proton exchange method is performed on the Z-cut surface of the LN or LT crystal substrate, because the inversion of polarization occur easily on the Z-cut surface and further both the X cut face (x in FIG. 1) containing the Z-Y axes with the X axis of the crystal as a normal line and the Y cut face (y in FIG. 1) containing the Z-X axes with the Y axis of the crystal as a normal line are corroded by the proton exchange. It is therefore considered that the X-cut substrate having, as a major surface, an X cut face containing the Z-Y axes with the X axis of the crystal as a normal line and a Y-cut substrate having, as a major surface, an X cut face containing the Z-X axes with the Y axis of the crystal as a normal line are improper for forming proton exchange layers, due to proton-exchange oriented corrosion.

On the other hand, a laser light can not be directly coupled to the end surface of the waveguide of the QPM-SMG using the Z-cut substrate because of a TM mode optically coupling. When the QPM-SHG element is used for an optical pickup device, an optical system such as a mode converter is required between the QPM-SHG element and a laser light source. As a result the optical pickup device is inevitably maximized.

To avoid the maximized device, the use of an X or Y-cut LN or LT substrate for the QPM-SHG element is attempted. For instance, there is a process for forming a proton exchange layer with application of an electric field in which a comb-shaped electrode is provided on a cut surface parallel to the Z-axis containing the Z-axis of an X or Y-cut LN or LT substrate and then, an electric field is applied to the substrate through the comb-shaped electrode so that periodic polarization inversion layers are fabricated. Since the teeth of the comb-shaped electrode are connected to each other, the conductance difference of the teeth give an unwanted influence to micro portion of the crystal. Therefore the production of uniform polarization inversion layers is difficult. In addition, an electric field with a high intensity 1 KV/mm or more is required since the polarization inversion is performed under the condition of the Curie point or less. In this case a destroying of crystal may occur due to the application of a high intensity electric field. Since the comb-shaped electrode is flat on the cut surface parallel to the Z-axis (an X or Y-cut surface), it is difficult to form deep polarization inversion layers from the cut surface. Shallow polarization inversion layers superpose and intersect an optical waveguide but the overlap portions is very small. As a result, the converting efficiency from a fundamental wave to a secondary haramonic is not improved.

To form deep polarization inversion layers from the cut surface, there is a process of forming polarization inversion layers which, as shown in FIG. 2, utilizing an internal electric field induced at boundary B between proton exchange layers 3a and substrate 1 by thermal diffusion of H+ during the formation of polarization inversion layers. This method includes the steps of forming proton exchange layers 3a on the X-cut surface in such a manner that the extending direction of each proton exchange layer 3a is inclined at an angle of $\phi$ with respect to the Z-axis and then, performing a heat-treatment on the substrate to form deep polarization inversion layers on the X-cut surface. Although such a process for forming a proton exchange layer utilizing an internal electric field is effective for the fabrication of a low order QPM structure which has a large pitch of inversion polarization layers, for instance about 10 μm, but not effective in a high order QPM structure which has a small pitch and width of proton exchange layers since internal electric fields cancel each other. As a result inversion polarization layers with a fine pitch are not fabricated.

SUMMARY OF THE INVENTION

It is therefore an object of the present invention to provide a process for forming polarization inversion layers which can easily form a fine periodic domain inversion structure with a high order QPM structure and which is capable of forming polarization inversion layers or proton exchange layers on a cut surface parallel to the Z-axis of an X or Y-cut LN or LT substrate. Another object of the present invention is to provide a wavelength converting element having deep polarization inversion layers from the X or Y-cut surface and capable of being directly coupling a laser light to the end surface of the waveguide of the QPM structure in TE mode.

To achieve the intended object, the present invention provides a process for forming a polarization inversion layer or proton exchange layers, comprises the steps of:

forming a plurality of stripe proton exchange layers at a predetermined periodic interval on a major surface containing a Z-axis of an X or Y-cut substrate made of lithium tantalate crystal or lithium niobate crystal each stripe proton exchange layer extending in the Z-axis direction;

annealing said substrate; and applying an electric field of direct current to said substrate from an outside wherein said electric field of direct current contains a field component toward an inverse direction of said Z-axis intersecting at an angle of θ in a range of 0°<θ<90° with respect said Z-axis during the annealing of said substrate.

A wavelength converting element according to the present invention comprises;

an X or Y-cut substrate made of lithium tantalate crystal or lithium niobate crystal having a major surface containing a Z-axis of the crystal;

a plurality of polarization inversion layers formed at a predetermined periodic interval on said major surface of the substrate each extending in the Z-axis and treated by applying an electric field of direct current to said substrate from an outside wherein said electric field of direct current contains a field component toward an inverse direction of said Z-axis intersecting at an angle of θ in a range of 0°<θ<90° with respect said Z-axis during an annealing of said substrate; and an optical waveguide intersecting with said polarization inversion layers formed and treated on said major surface of the substrate.

According to the present invention, it is easy to fabricate deep polarization inversion layers with a fine pitch and width on a Y or X-cut surface of the crystal substrate to satisfy a high QPM condition to produce a wavelength converting element having a fine periodic domain inversion structure and a high optical converting efficiency.

DETAILED DESCRIPTION OF THE PREFERRED EMBODIMENTS

Embodiments of the present invention will now be described referring to the accompanying drawings.

Figure 1:
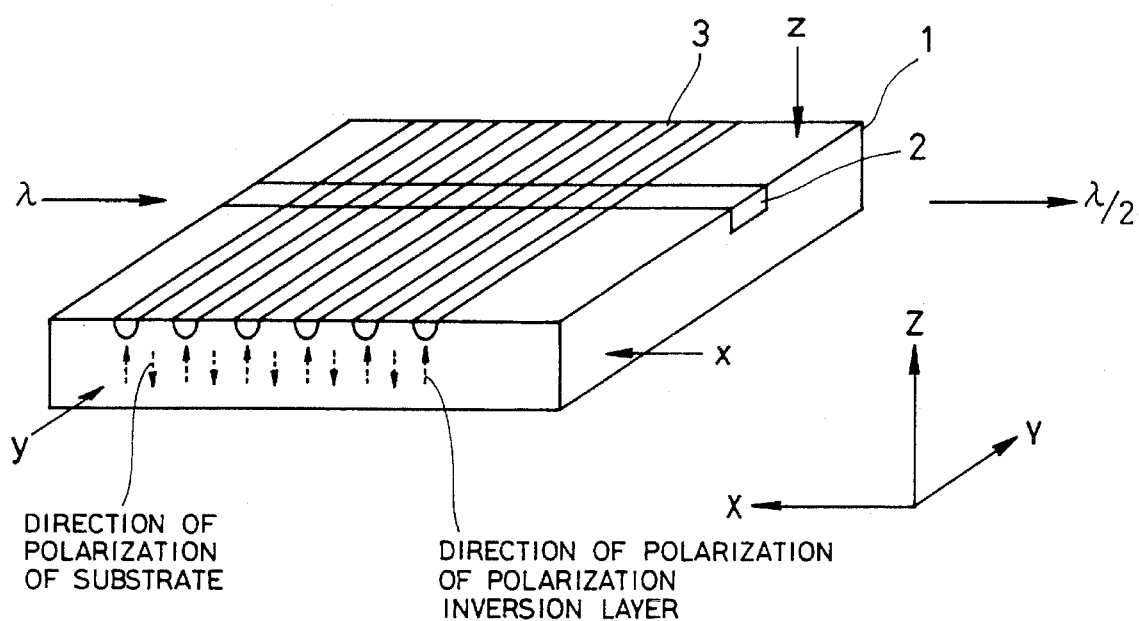
FIG. 1 is a schematic perspective view showing a conventional QPM-SHG element.
Figure 2:
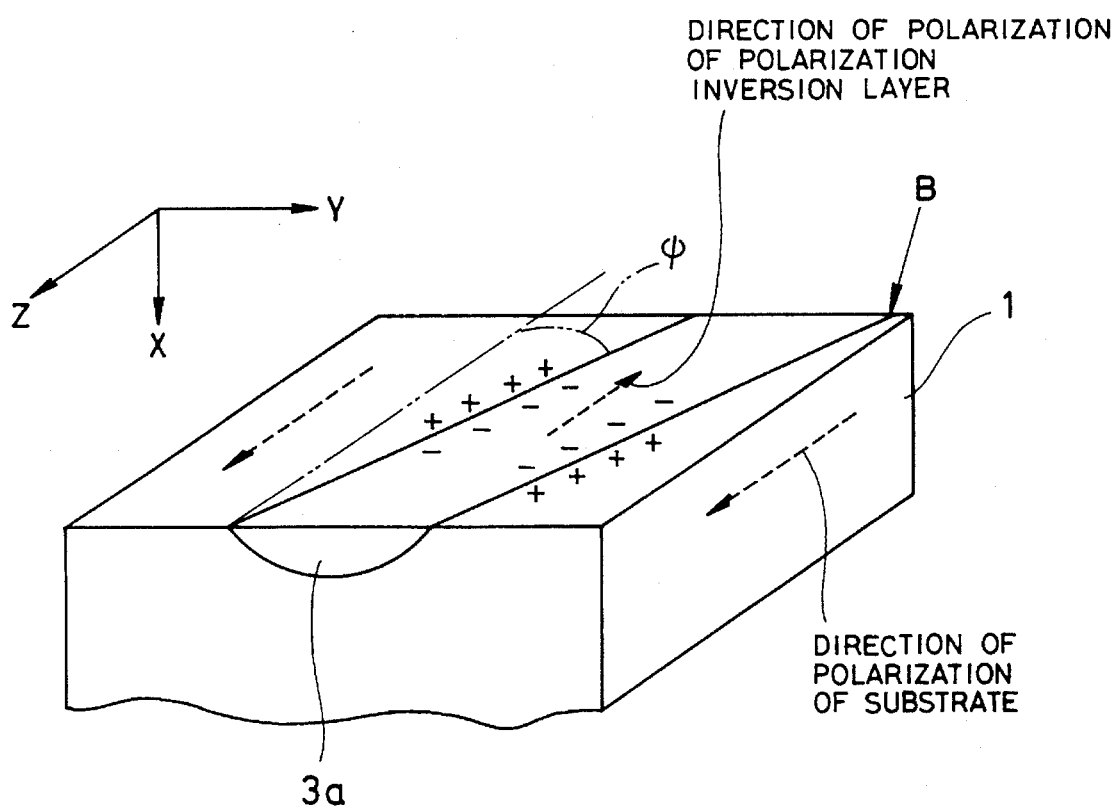
FIG. 2 is a schematic partial perspective view showing a substrate treated by a conventional process for forming a proton exchange layer.
Figure 3A:
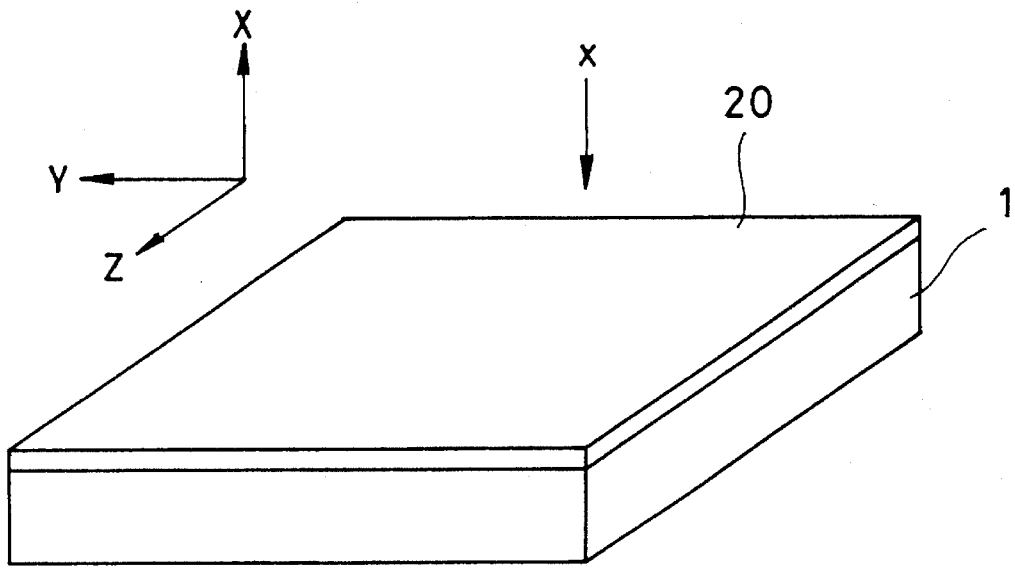
FIGS. 3A and 3B are schematic perspective views each showing a substrate treated by a step of a process for forming proton exchange layers according to an embodiment of the present invention.
Figure 3B:
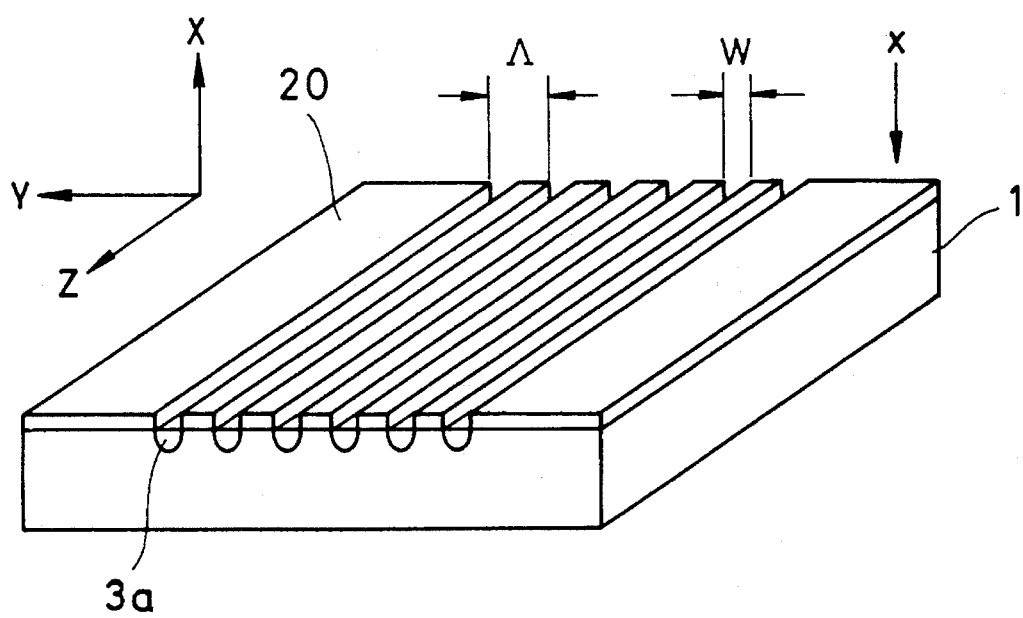
Figure 4:
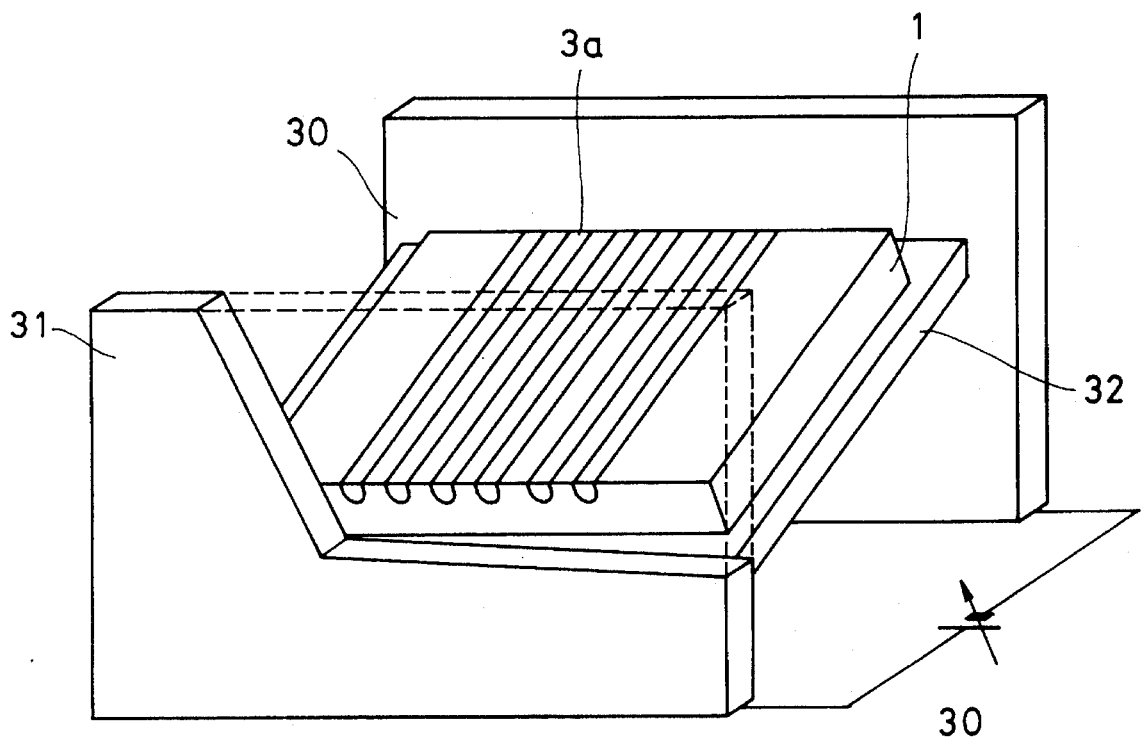
FIG. 4 is a schematic partial perspective view showing a main portion of an annealing device partially cut and a substrate treated by an application of an electric field during annealing which are used in a process for forming proton exchange layers according to an embodiment of the present invention.
Figure 4:
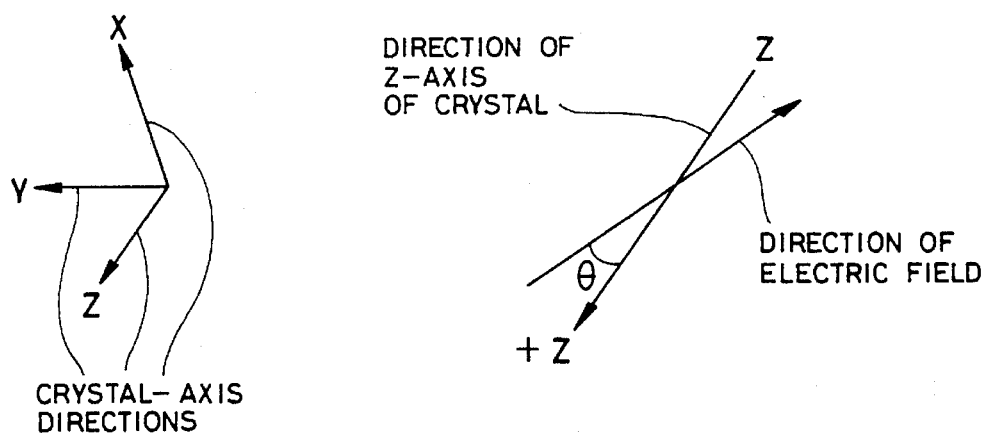

FIGS. 3 and 4 illustrate a process for forming proton exchange layers, by which a three-dimensional polarization inversion layers can be formed on a LT crystal substrate.

Using an X-cut LT substrate 1 (its major surface contains the Z-axis), a grating or slitted pattern mask of a corrosion proof material against a proton exchange such as Ta etc. is formed on the major surface of the substrate by a photolithography method and a reactive ion etching method (RIE) or the like (FIG. 3A). Although the X-cut LT substrate is used as an example above, a LT or LN substrate whose major surface contains the Z-axis such as an X-cut LT substrate, an X-cut LN substrate, a Y-cut LT substrate or a Y-cut LN substrate is usable. While proton exchange is conducted by pyrophosphoric acid, another proton exchange source, such as benzoic acid, may also be used. The mask may be made of any material so long as it can withstand proton exchange involving pyrophosphoric acid such as gold (Au), platinum (Pt), as well as tantalum (Ta). With the use of benzoic acid in proton exchange, aluminum (Al), chromium (Cr) and titanium (Ti) can also be used for the grating mask.

First, the Ta film 20 is vapor-deposited or sputtered on the X-cut surface x of the substrate over the whole at a predetermined thickness, for instance 300–400 angstroms.

Next, a photoresist material is applied at a predetermined thickness on the Ta film 20 by a spin coater to provide a photoresist film, followed by patterning through a pattern mask with many slits using a photo process using a contact exposure device, alternatively by using an electron beam patterning device. Then, dry etching is performed in the atmosphere of a $CF_4$ or $CF_6$ gas, and the photoresist film is removed using acetone or a remover, to form a Ta film 20 having elongated slits on the substrate 1.

As shown in FIG. 3B, the slit pattern has a pitch $\Lambda=3.6$ μm is used in case that, for instance, a QPM-SHG element of a first order QPM condition used for a fundamental wave (its wavelength $\lambda=860$ nm). In case of a third order QPM condition with the same fundamental wave, the pitch of slit is $\Lambda=10.8$ μm. In the latter the width of each slit opening may be $W=5$ μm for instance, the pitch $\Lambda$ is determined to satisfy the formula $\Lambda=m\lambda/2(n_{SH}-n)$ where m denotes an order number of QPM condition, $\lambda$ denotes a wavelength of a fundamental wave used, $n_{SH}$ denotes an equivalent refractive index of an optical waveguide with respect to a secondary harmonic and n denotes an equivalent refractive index of an optical waveguide with respect to a fundamental wave.

Subsequently, proton exchange is carried out through the slits of the Ta film 20 at a proton exchange temperature of 230–265 degrees centigrade, preferably 260 degrees centigrade using pyrophosphoric acid as a proton source for a proton exchange time of 15 minutes to 2 hours, preferably 30 minutes. After that, proton exchange layers 3a are yield on the X-cut surface x (see FIG. 3B). While this proton exchange is conducted by pyrophosphoric acid, another proton exchange source of benzoic acid may also be used.

Subsequently, the mask of Ta film 20 is removed by fluoro-nitric acid. The proton exchange lowers the Curie point of proton exchange layers.

Then the resultant substrate is subjected to heat treatment of annealing in an electric field. An annealing device carrying out together with the application of the electric field includes a heating chamber (not shown) and an assembly which is provided as shown in FIG. 4 with a pair of electrode plates 30, 31 separated parallel to each other and a support plate 32 bridged and inclined between the plates. The support plate 32 is made of an electrically insulating material, for instance, a material with durability against heat-shock such as fluoric nitride. Both the electrode plates are connected to a variable DC power supply 35. The distance between the electrode plate is 15 mm. In this annealing device, the electrode plates apply an electric field of direct current to the substrate in such a manner that the electric field of direct current contains a field component toward an inverse direction of the Z-axis intersecting at an angle of $\theta$ in a range of $0°<\theta<90°$ with respect said Z-axis during the annealing of the substrate.

The substrate 1 with proton exchange layers 3a is set up and disposed on the support plate 32 as shown in the figure.

In this case, the substrate 1 and the support plated 32 is inclined preferably at an angle of $\theta=45°$ with respect to the normal line of the electrode plate so as to attract effectively protons towards the depth direction of the substrate by the applied electric field.

An electric field of direct current of 500 V/cm is applied toward the inverse Z axis (C-axis) between the electrode plates 30, 31 and at the same time, the substrate 1 is rapidly heated up to 550 centigrade degree at a heating rate of +60 centigrade degree/sec. and then to keep the temperature of the substrate for 2 minutes to leave and naturally cool the substrate to room temperature to turn the proton exchange layers into periodic domain inversion layers. As a result, deep polarization inversion layers are formed in the X-cut surface.

In this example, the LT substrate having the Curie point of 604 centigrade degree comparatively low, an X or Y-cut LN substrate whose major surface containing the Z-axis having a high Curie point of 1133 centigrade degree may be also used and it achieves the same advantageous effect in the electric field applied annealing above mentioned. In the latter case, a low Curie point layer is utilized instead of proton exchange layers in that a $SiO_2$ grating mask is provided on the cut surface of the substrate and Lithium (Li) is removed through the mask.

The depth and shape of the polarization inversion layers have been observed. Various polarization inversion layers are fabricated on X-cut LT substrates under both the conditions of the proton exchange temperature of 260 centigrade degree for 30 minutes for the formation of proton exchange layers and of the distance of 15 mm between the electrode plates in the annealing device, the inclined angles of the support plate and substrate of $\theta=0°–90°$, the applied electric fields of direct current of 0–500 V/cm across the electrode plates towards the inverse C-axis or Z-axis direction, the adjacent Curie point of LT of 550 centigrade degree for 2 minutes up to 400 centigrade degree at a cooling rate of –5 centigrade degree/sec. for the annealing of the substrate. In addition, these polarization inversion layers are compared to polarization inversion layers formed under the same conditions excepting non electric field applied to the substrates.

Figure 5:
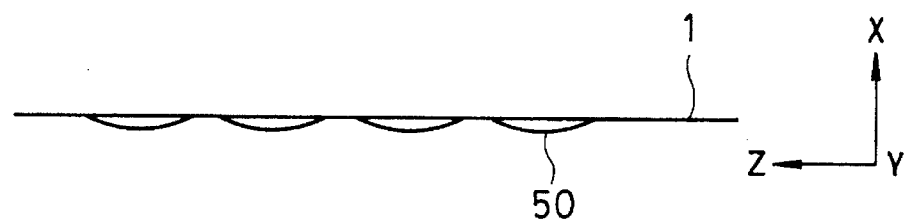
FIG. 5 is an enlarged cross-sectional view showing polarization inversion layers fabricated on a crystal substrate after annealing it without any application of electric field.
Figure 6:
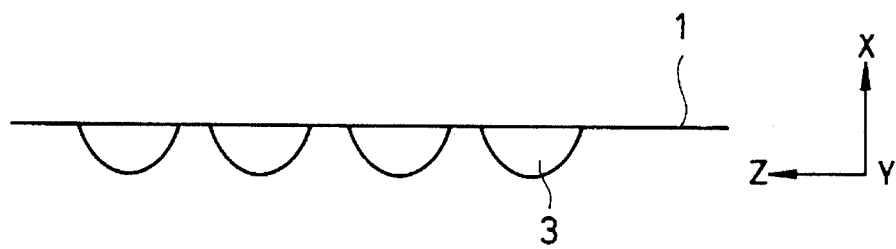
FIG. 6 is an enlarged cross-sectional view showing polarization inversion layers fabricated on a crystal substrate after annealing it with an application of an electric field according to an embodiment of the present invention.

In the comparative sample of non electric field applied to the substrates during the annealing, polarization inversion layers 50 are shallow island-shaped in a cross-sectional view taken off along Y-axis direction of the substrate as shown in FIG. 5. In contrast, FIG. 6 shows a cross-sectional view taken off along Y-axis direction of the substrate to which the electric field was applied during the annealing, it is apparent that uniform and periodic and deep island-shaped polarization inversion layers 3 are obtained according to the embodiment. It is understood that the proton exchange layers or thermal diffusion layers each having the low Curie point are selectively poled by an outside electric field.

Figure 7:
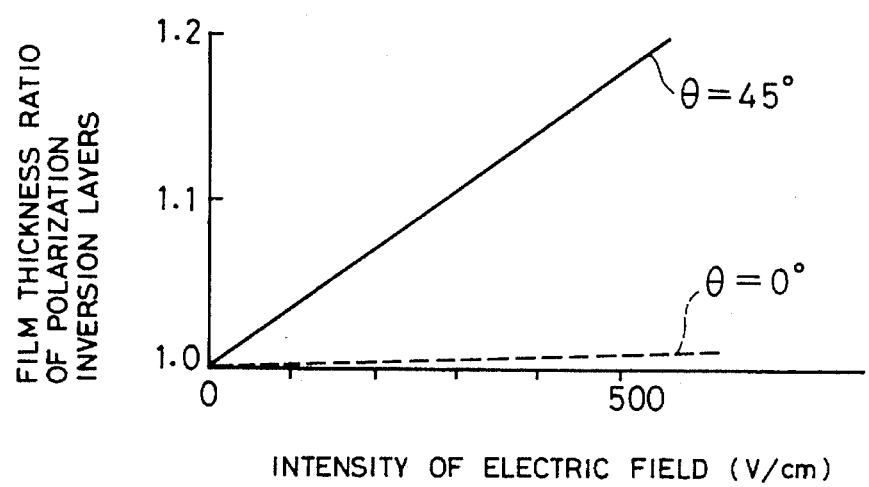
FIG. 7 is a graph showing the change of the ratio of film thickness of polarization inversion layers with respect to the intensity of electric field applied to the crystal substrate in which intersecting angles of the electric fields are 0° and 90° with respect the Z-axis of the substrate.

FIG. 7 is a graph showing the change of the ratio of film thickness of polarization inversion layers with respect to the intensity of the electric field applied to the crystal substrate, in which the electric fields are applied toward an inverse direction of the Z-axis of the substrate and intersecting with the Z-axis at angles of $\theta$ 0° and 90° to the Z-axis during the annealing of the substrate. The ratio of film thickness is standardized with respect to a thickness formed in non electric field applied to polarization inversion layers. In case of the intersecting angle of $\theta=0°$, a proton attracted effect is hardly obtained since the extending direction of the applied electric field is parallel to the Z-axis direction of the substrate. In case of $\theta=45°$, the thickness of polarization inversion layers increases in proportion to the intensity of applied electric field. The proton attracted effect is effective in an angle range of θ=45°–<90° but its electric field component of E·cos θ (where E denotes the applied electric field) contributing to improve the polarization inversion becomes small. In the case of θ=90°, polarization inversion (poling) is not obtained. In this way, it is understood that the thickness (depth) of polarization inversion layers can be easily controlled by means of both controls of the intensity of electric field and the intersecting angle of θ are controlled.

Figure 8A:
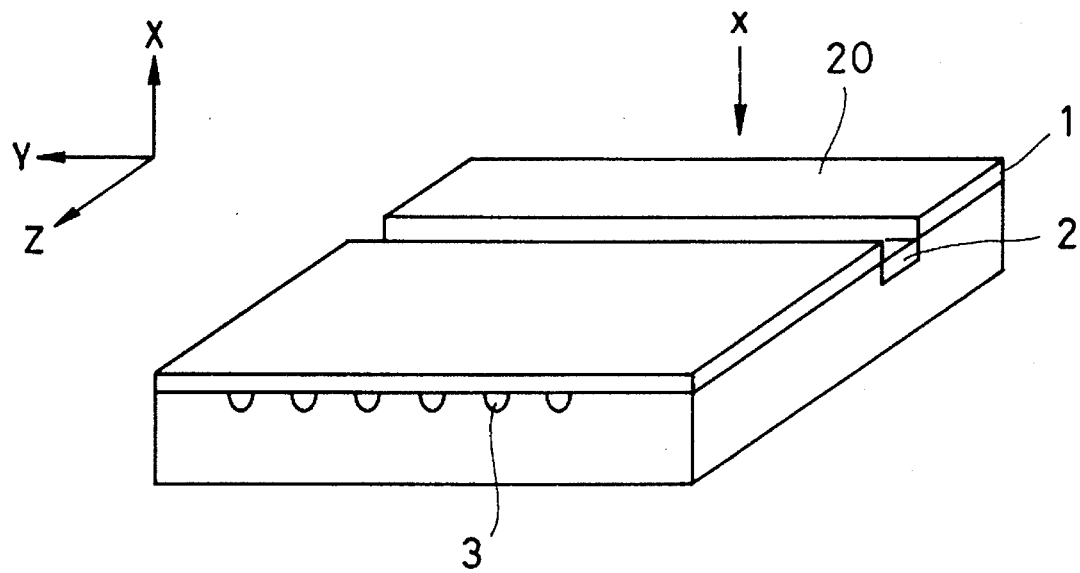
FIGS. 8A and 8B are schematic perspective views each showing a substrate treated by a step of a process for forming a QPM-SMG element according to another embodiment of the present invention.
Figure 8B:
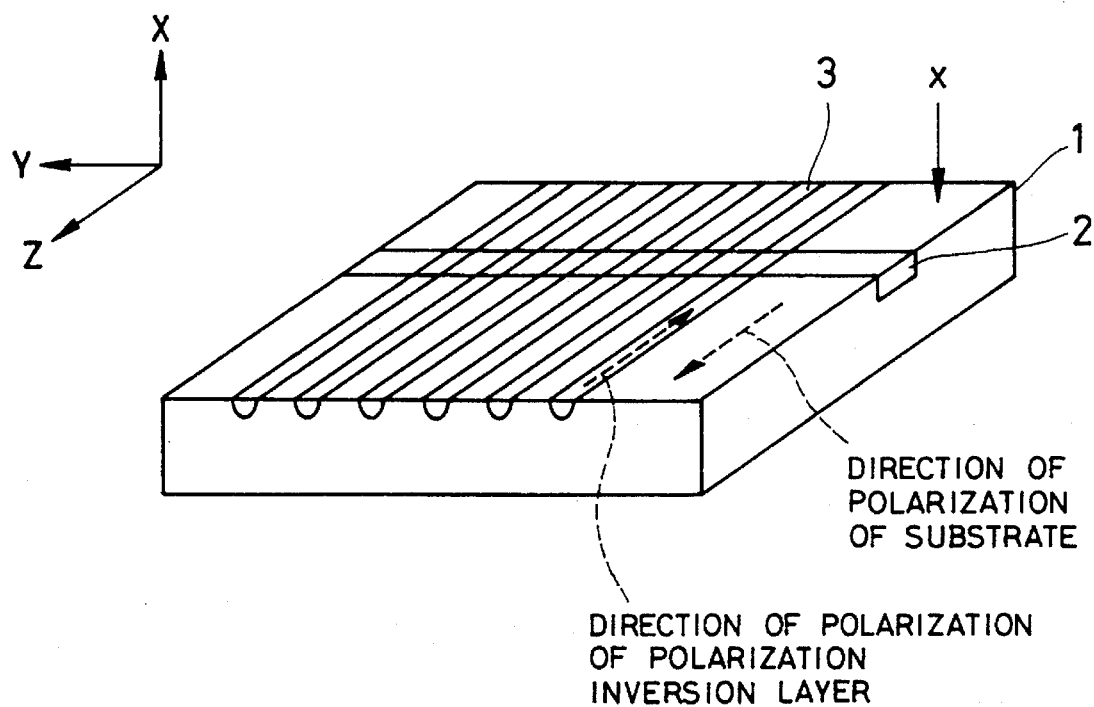

A QPM-SHG element was formed on the basis of the X-cut LT substrate having deep polarization inversion layers previously formed thereon as shown in FIGS. 8A and 8B.

The Ta film 20 with an opening pattern perpendicular to the polarization inversion layers 3 at predetermined pitches was formed on the substrate 1 (see FIG. 8A). That is, the Ta film with a thickness of 300 angstroms was formed again entirely on the X cut face, and slits having a 4 μm width were formed in the Ta film by the photolithography and reactive ion etching, or the like. The lengthwise direction of the slits may be the Y direction and the number of slits may be one.

The resultant substrate was then subjected to proton exchange in phosphoric acid for 30 minutes at 260 centigrade degree to form a proton exchange waveguide 2.

Then, annealing was conducted in an oxygen gas atmosphere of for 30 minutes at 340 centigrade degree, turning the latter proton exchange waveguide into a three-dimensional optical waveguide with a low propagation loss.

Further, the proton exchanged Ta film 20 was removed to provide a waveguide type QPM-SHG element having the optical waveguide 2 formed perpendicular to the polarization inversion layers 3 (see FIG. 8B). The QPM-SHG element was furnished by subjecting both end faces of the waveguide 2 to an optical polishing method. By allowing a fundamental wave of wavelength λ=860 nm in TE mode to be incident to one end face of this waveguide, second harmonic (SHG) light of wavelength λ=430 nm was able to be extracted from the other end. That is, it was confirmed that blue light emission is effectively achieved in this QPM-SHG element comprising periodic and deep polarization inversion layers formed in accordance with the present invention. Since the deep polarization inversion layers are superposed and intersected to the optical waveguide so that the fundamental wave passed through and crossed over the deep polarization inversion layers in large quantities, the QPM-SHG element has an improved high optical converting efficiency.

According to the embodiment, the above mentioned electric field applied annealing enables to fabricate easily periodic polarization inversion layers each having an uniform and deep cross-sectional profile in the X or Y-cut LT or LN substrate whose major surface containing the Z-axis by a simple method for using a proton thermal diffusion pattern. Since a precision mask used in the proton exchange controls the shapes of polarization inversion layers, not only the cross-sections of polarization inversion layers in the Y-axis direction is equalized but also in the Z-axis direction.

In the case of ferroelectric substrate in the proton exchange, needle shaped inversion layers may be generally formed in an exceeding annealing time period. In contrast, any needle shaped inversion layer is generated in the embodiment since a pertinent electric field is applied to the substrate but a round profile uniform polarization inversion layers are obtained. The size of inversion portion generally depends on the density of acid for the proton exchange and the acid much remains adjacent to the surface of the substrate in a short time period of proton exchange. The remaining acid causes to increase the propagation loss of the waveguide of the QPM-SHG. However, the embodiment enables to decreases the concentration of proton by inclining the substrate in an direct current electric field during the annealing after the proton exchange, so that the manufacturing process of QPM-SHG element may be simplified.

The polarization adjacent to the surface of the substrate puts back to the original direction in the formed polarization inversion layer by the conventional method. However, the embodiment enables to prevent the back polarization to keep the polarization inversion region equalized.

The inclination of the X or Y-cut LT or LN substrate in the electric field during the annealing enables to cause an attraction of proton in the depth direction of the substrate to generate a further deep polarization inversion layer.

In the above embodiment, the intensity of electric field is set at 500 V/cm, an electric field may be of a several V/cm intensity sufficient to the poling. The large intensity of electric field of 500 V/cm or more in the electric field may be also used so that the polarization inversion threshold in the density of protons decreases to expand the polarization inversion regions. In addition, the above embodiment increase the proton attracted effect of polarization inversion layers in the depth direction by increasing the intensity of electric field as far as a destroying of insulation in the crystal substrate occurs due to the exceeding intensity of electric field.

Figure 9:
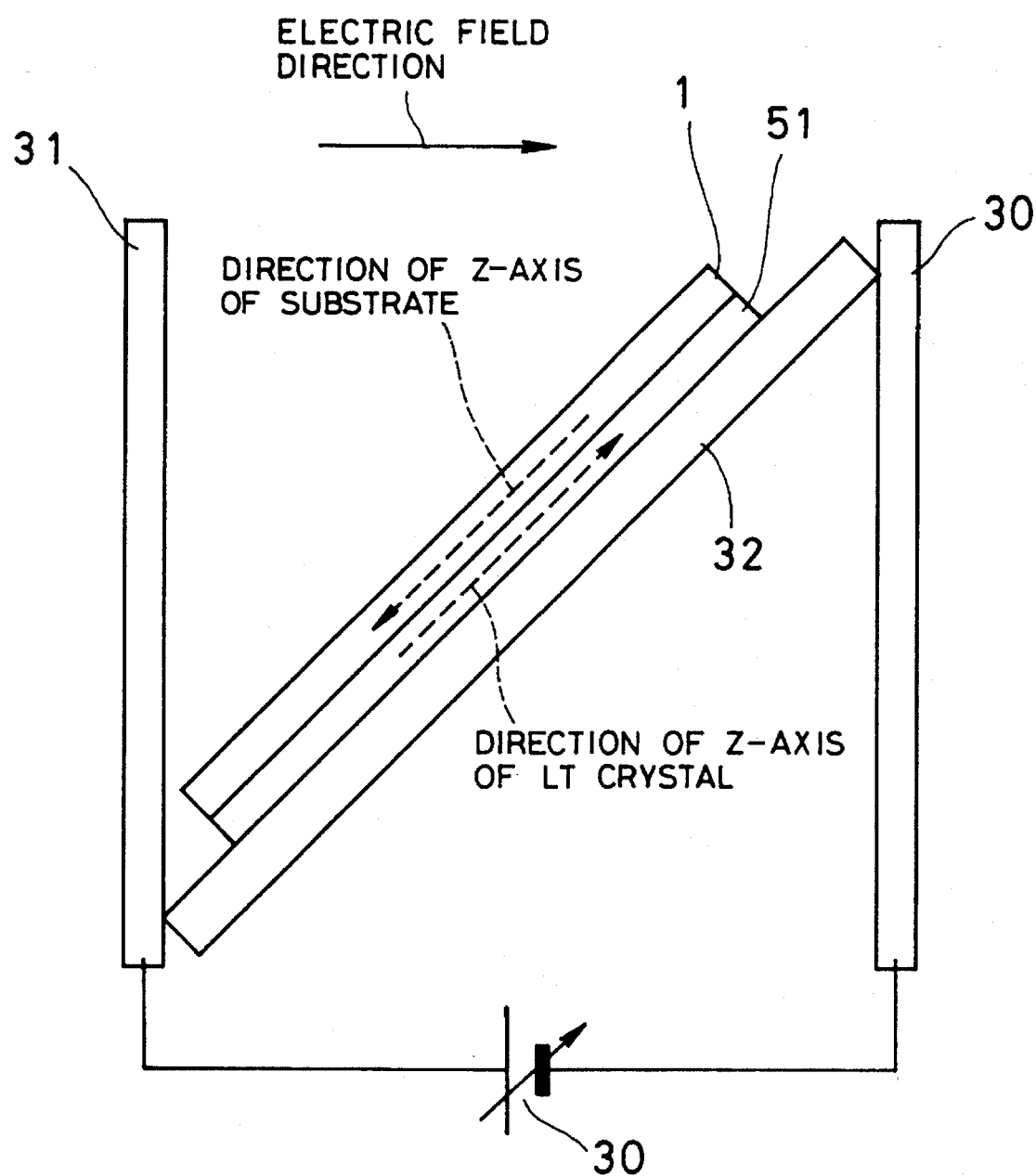
FIG. 9 is a front elevation showing a main portion of an annealing device and a substrate treated by an application of an electric field during annealing which are used in a process for forming proton exchange layers according to another embodiment of the present invention.

Other embodiments are proposed as follows:

To improve the passing of the applied electric field through the substrate supported by the support plate 32 in the annealing device as shown in FIG. 4, another LT crystal substrate 51 substantially the same as the substrate 1 is overlapped and disposed between the substrate 1 and the support plate 32 as shown in FIG. 9 in such a manner that the Z-axis direction of the LT crystal substrate 51 face toward the same direction of the applied electric field (the right hand direction in the figure). In this way, the overlapping of the substrates improves the efficiency of internal passing of the electric field in the substrate, so that good polarization inversion layers are obtained.

Figure 10:
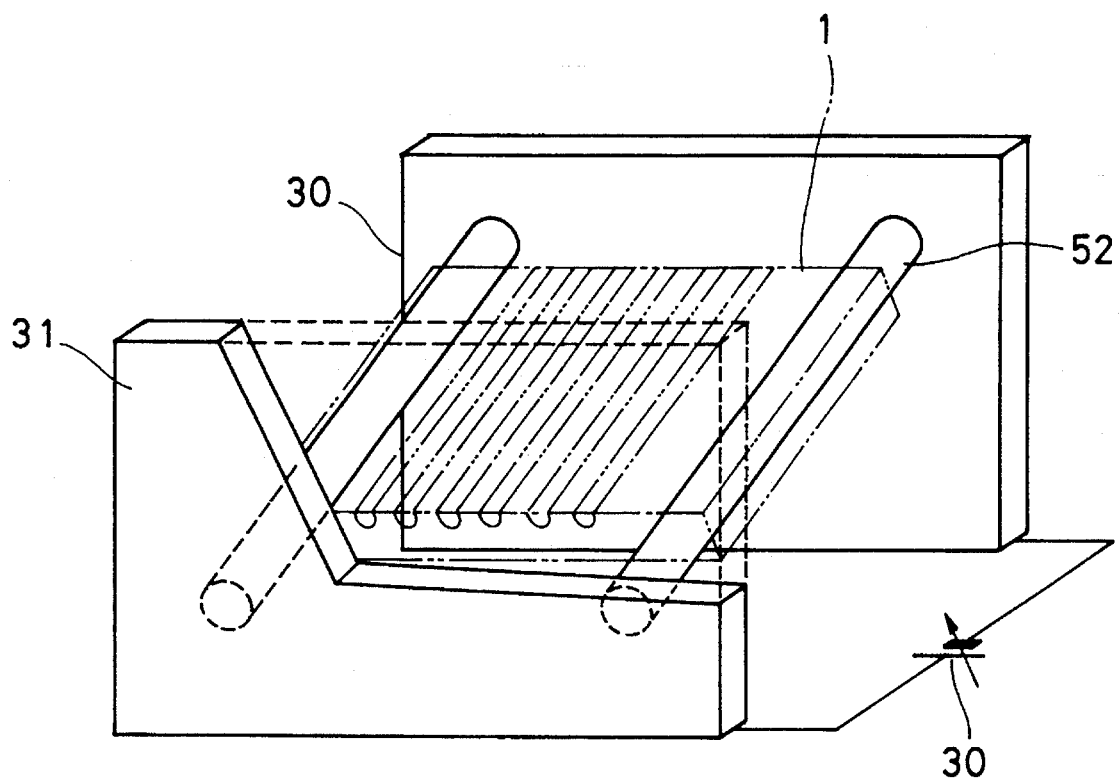
FIG. 10 is a schematic partial perspective view showing a main portion of an annealing device partially out and a substrate treated by an application of an electric field during annealing which are used in a process for forming proton exchange layers according to another embodiment of the present invention.
Figure 11:
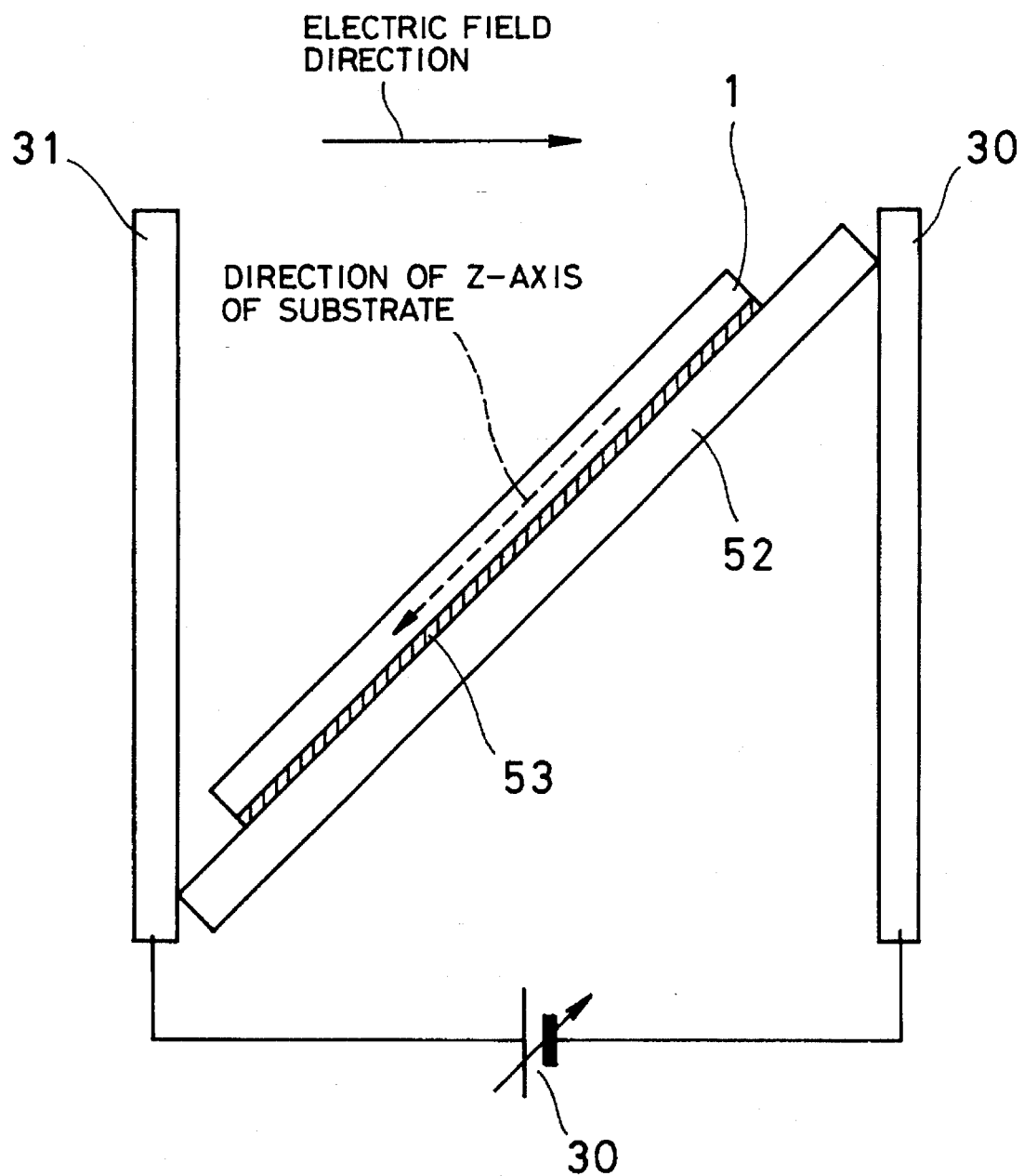
FIG. 11 is a front elevation showing a main portion of an annealing device and a substrate treated by an application of an electric field during annealing which are used in a process for forming proton exchange layers according to further another embodiment of the present invention.

Instead of the support plate 32 as shown in FIG. 4, a pair of insulation rods 52 such as an alumina tube supporting substrate 1 may be used at both sides of the substrate 1 as shown in FIG. 10. This embodiment enables to allow the electric field passing stably through the substrate 1. In the above embodiments, since the substrate is transparent for an infrared ray the rapid heating of the substrates is difficult. To heat the substrates rapidly, a colored insulation thin film 53 such as a forstarite film may be sputtered or vapor-deposited on the back surface of the substrate 1 at about a 1000 angstroms thickness as shown in FIG. 11.

Figure 12:
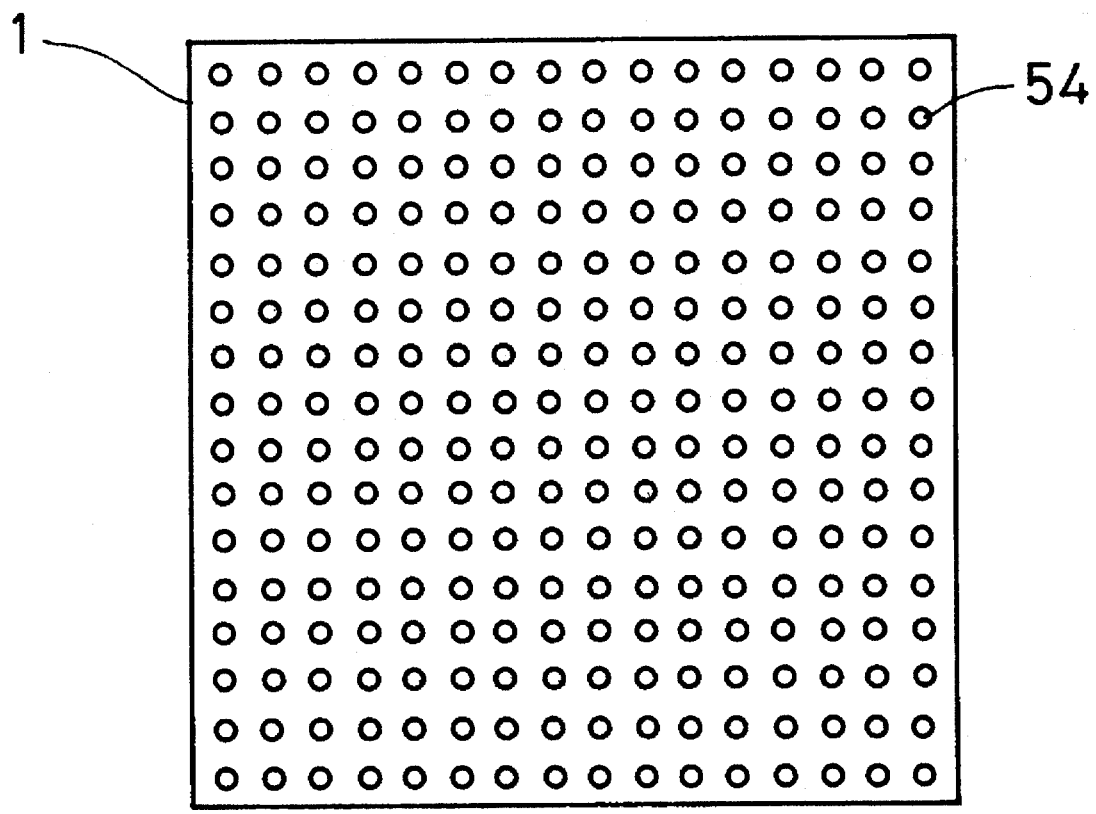
FIG. 12 is a back view of a substrate disposed in an annealing device which are used in a process for forming proton exchange layers according to another embodiment of the present invention.

In addition, a metal film such as Cr may be deposed the back surface of the substrate 1 supported by the insulation rods 52 in order to improve the internal passing of electric field. Furthermore it is required to avoid the conduction of an electric current in the back face of the substrate 1. As shown in FIG. 12, a plurality of fine metal islands 54 such as Cr each having a 0.2 mm diameter may be homogeneously deposited at a 0.2 mm interval matrix on the back surface of the substrate 1, so that this embodiment allows the electric field passing stably through the substrate 1 without conduction of the electric current in the back face thereof. The metal islands 54 may be sputtered or vapor-deposited with an optional shape at a 1000 angstroms thickness as long as the film islands separated sufficiently to maintain electrical insulation.

In the above embodiments, applying an electric field of direct current containing a field component toward an inverse direction of the Z-axis intersecting at an angle of θ is applied to the substrate from an outside during the annealing. Such a DC application of electric field is achieved by using a variable DC supply generating a one-way direction current without fluctuation or a very little change. Off course, the electric field of direct current includes an electric field of plus currents with a one-way direction. The electric field of plus currents achieves the same advantageous effect as the above embodiments.

In the above embodiments, the electric field is applied from the substrate 1 to the support plate 32. In a further other embodiment, the electric field may be applied from the support plate 32 to the substrate 1 as far as the relationship between the Z-axis direction of the crystal substrate and the direction the electric field is kept as well as the above embodiments. In this case the substrate 1 rotated about the Y-axis direction of the crystal by 180° and disposed on the support plate.

As mentioned above, a process for forming polarization inversion layers with the QPM structure on a ferroelectric crystal substrate used for the QPM-SHG element according to the present invention, is characterized in that the process comprises a step of applying an electric field of direct current to the X or Y-cut LT of LN substrate from an outside wherein the electric field of direct current contains a field component toward an inverse direction of the Z-axis intersecting at an angle of θ in a range of 0°<θ<90° with respect the Z-axis during the annealing of the substrate. Therefore, by the present invention, deep polarization inversion layers with a small pitch and width are easily formed the X or Y-cut surface of the specific crystal substrate, so that the QPM-SHG element having a high order QPM structure can be manufactured. The QPM-SHG element according to the present invention is able to be directly coupled to a semiconductor laser in TE mode at the input end surface thereof, whose waveguide intersects and overlaps deeply polarization inversion layers with deeper depths of the X or Y-cut surface, so that an optical wavelength converting is achieved at a high efficiency.

What is claimed is:

1. A process for forming a polarization inversion layer or proton exchange layers, comprising the steps of;

forming a plurality of stripe proton exchange layers at a predetermined periodic interval on a major surface containing a Z-axis of an X or Y-cut substrate made of lithium tantalate crystal or lithium niobate crystal each stripe proton exchange layer extending in the Z-axis direction;

annealing said substrate; and applying an electric field of direct current to said substrate wherein said electric field of direct current contains a field component toward an inverse direction of said Z-axis intersecting at an angle of θ in a range of 0°<θ<90° with respect to said Z-axis during the annealing of said substrate.

2. A wavelength converting element comprising;

an X or Y-cut substrate made of lithium tantalate crystal or lithium niobate crystal having a major surface containing a Z-axis of the crystal;

a plurality of polarization inversion layers formed at a predetermined periodic interval on said major surface of the substrate each extending in the Z-axis direction and treated by applying an electric field of direct current to said substrate wherein said electric field of direct current contains a field component toward an inverse direction of said Z-axis intersecting at an angle of θ in a range of 0°<θ<90° with respect to said Z-axis during an annealing of said substrate; and an optical waveguide intersecting with said polarization inversion layers formed and treated on said major surface of the substrate.

* * * * *